US007480208B2

(12) United States Patent
Bender et al.

(10) Patent No.: US 7,480,208 B2
(45) Date of Patent: Jan. 20, 2009

(54) OCCUPANCY SENSOR ASSEMBLY

(75) Inventors: R. Kurt Bender, Dripping Springs, TX (US); Jonathan D. Williams, Austin, TX (US); Thomas J. Hartnagel, Taylor, TX (US); Vadim Konradi, Austin, TX (US)

(73) Assignee: Hubbell Incorporated, Orange, CT (US)

( * ) Notice: Subject to any disclaimer, the term of this patent is extended or adjusted under 35 U.S.C. 154(b) by 200 days.

(21) Appl. No.: 11/138,911

(22) Filed: May 27, 2005

(65) Prior Publication Data

US 2006/0266949 A1 Nov. 30, 2006

(51) Int. Cl.
*G01S 15/00* (2006.01)

(52) U.S. Cl. ........................... 367/93; 367/94; 340/554; 340/565

(58) Field of Classification Search ................. 340/554, 340/565; 367/93–94
See application file for complete search history.

(56) References Cited

U.S. PATENT DOCUMENTS 2,096,839 A 10/1937 Barlow
D243,513 S 3/1977 Galvin et al.
4,057,794 A 11/1977 Grossfield
D266,996 S 11/1982 Beeson et al.
D271,573 S 11/1983 Wada et al.
4,418,337 A 11/1983 Bader
D290,239 S 6/1987 Bergeron
4,678,985 A 7/1987 Moski
4,703,171 A 10/1987 Kahl et al.
D294,231 S 2/1988 Cameron et al.
4,751,399 A 6/1988 Koehring et al.
4,841,285 A 6/1989 Laut
D305,881 S 2/1990 Bergeron
D312,072 S 11/1990 Bergeron
5,142,199 A 8/1992 Elwell
D336,893 S 6/1993 Bergeron
D337,542 S 7/1993 Ewing et al.
D337,733 S 7/1993 Ewing et al.
D339,108 S 9/1993 Bergeron
5,281,961 A 1/1994 Elwell
5,293,097 A 3/1994 Elwell
5,319,283 A 6/1994 Elwell
5,363,688 A 11/1994 Elwell
5,392,631 A 2/1995 Elwell
5,394,035 A 2/1995 Elwell (Continued)

OTHER PUBLICATIONS

The Watt Stopper, Inc., UT-355 Line Voltage Ultrasonic Occupancy Sensor, Pub. No. 19301.

(Continued)

*Primary Examiner*—Benjamin C Lee
*Assistant Examiner*—Samuel J Walk
(74) *Attorney, Agent, or Firm*—Jenae C. Gureff; Mark S. Bicks; Alfred N. Goodman

(57) ABSTRACT

An occupancy sensor is provided with a housing having an interior cavity. A switch is mounted in the interior cavity of the housing and configured for placement in the open and closed positions. A fascia cover plate may be positioned on the housing to enclose the interior cavity. The fascia cover plate has a fascia rib on an interior surface thereof. The fascia rib is arranged to interfere with the switch in the disabled state to prevent positioning of the fascia cover plate on the housing.

9 Claims, 5 Drawing Sheets

U.S. PATENT DOCUMENTS

| | | | |
|---|---|---|---|
| 5,703,368 A | 12/1997 | Tomooka et al. | |
| D401,175 S | 11/1998 | Bender et al. | |
| 5,861,806 A | 1/1999 | Vories et al. | |
| 5,973,594 A | 10/1999 | Baldwin et al. | |
| 6,049,281 A | 4/2000 | Osterweil | |
| 6,082,894 A | 7/2000 | Batko et al. | |
| D430,055 S | 8/2000 | Aiello et al. | |
| D430,056 S | 8/2000 | Aiello et al. | |
| 6,150,943 A | 11/2000 | Lehman et al. | |
| D435,798 S | 1/2001 | Aiello et al. | |
| D439,853 S | 4/2001 | Aiello et al. | |
| 6,222,191 B1 | 4/2001 | Myron et al. | |
| 6,480,103 B1 | 11/2002 | McCarthy et al. | |
| D472,486 S | 4/2003 | Eckel et al. | |
| 6,587,049 B1 | 7/2003 | Thacker | |
| D485,774 S | 1/2004 | Hwang et al. | |
| 6,798,341 B1 | 9/2004 | Eckel et al. | |
| 7,411,489 B1 * | 8/2008 | Elwell et al. | 340/501 |
| 2005/0043907 A1 * | 2/2005 | Eckel et al. | 702/62 |
| 2006/0138329 A1 * | 6/2006 | Wu et al. | 250/342 |

OTHER PUBLICATIONS

Hubbell Building Automation, Inc., LightHAWK LH-MT/LH-MT-HL Intelligent Self-Adjusting Multi-Technology.

Hubbell Building Automation, Inc., LightHAWK LH-US/LH-US-RR Intelligent Self-Adjusting Ultrasonic Wall Switch Sensors.

Hubbell Building Automation, Inc., WSI200AT Adaptive Timing Passive Infrared Wall Switch Sensor.

Hubbell Building Automation, Inc., IWSZPZP Passive Infrared Wall Switch Sensor.

Hubbell Building Automation, Inc., SOM101 Passive Infrared Wall Switch.

Hubbell Building Automation, Inc., SOM102 Passive Infrared Wall Switch 2 Circuits.

* cited by examiner

OCCUPANCY SENSOR ASSEMBLY

CROSS-REFERENCE TO RELATED APPLICATIONS

Related subject matter is disclosed in co-pending U.S. patent application of Williams et al., filed even date herewith, entitled "Dual Circuit Wall Switch Occupancy Sensor and Method of Operating Same" (Ser. No 11/138,084); and in co-pending U.S. patent application of R. Kurt Bender et al., filed even date herewith, entitled "Occupancy Sensor Fascia Cover Plate" (Ser. No. 29/230,825); the entire contents of each of these applications being expressly incorporated herein by reference.

FIELD OF THE INVENTION

The present invention relates to an occupancy sensor assembly. More particularly, the present invention relates to an improved occupancy sensor assembly which facilitates maintenance of the sensor assembly, enhances effectiveness of ultrasonic sensors, and minimizes damage to the assembly in high abuse applications.

BACKGROUND OF THE INVENTION

An occupancy sensor is designed to detect the presence of a person(s) in a room, usually in order to determine whether various electrically powered loads in that room (for example, lights, ventilation, and the like) should be turned on or not. This is of particular advantage to institutions that have occupants who are not directly responsible for paying for the electricity they consume, since these people often do not exercise diligence in regularly turning off electrically powered loads, such as lights, ventilation, and the like, when they leave a room. Occupancy sensors may therefore conserve a great deal of energy. This has led many businesses to purchase them voluntarily; it has also resulted in laws in certain states mandating the use of occupancy sensors in large areas as an environmental conservation measure.

The two most prevalent types of occupancy sensors used with automatic wall switches, either singularly or in combination with one another, are passive infrared and active ultrasonic devices.

Generally, a passive infrared ("PIR") sensor will turn on the load whenever it detects a moving or newly apparent heat source. Passive infrared occupancy detection technology allows continuous detection of moving objects that emit infrared energy. This method of occupancy detection is also quite sensitive even though it is based on passive sensing of moving sources of infrared energy.

An active ultrasonic sensor emits vibrations at frequencies of 25 kHz or higher and listens to the return echoes; if it detects a significant Doppler shift, indicating the presence of a moving body, then it turns the load on. Either detector will turn the load back off after a certain interval of no motion sensed, usually three to sixty minutes as determined by the user. The motion sensitivity of the device is usually also set by the user.

More specifically, active ultrasonic acoustic Doppler occupancy detection technology allows continuous detection of moving objects that reflect ultrasonic acoustic energy. For example, currently available light switches or the like used in offices emit an ultrasonic wave into a room and detect motion of persons by sensing a Doppler-shift in the reflected ultrasonic wave. The Doppler-shift in the reflected wave is caused by persons moving within the room. This method of occupancy detection is highly sensitive since it is based on an active source of ultrasonic acoustic energy. An apparatus and method of this type are disclosed in U.S. Pat. No. 5,640,143, to Myron et al (assigned to the same assignee as the present invention), the entire disclosure of which is incorporated hereby by reference.

Each of these types of sensors is not without disadvantage. For example, PIR sensors require a lens. The lens has an exposed front wall which allows transmission of infrared energy to detect occupancy. The front wall is typically arranged in close proximity to manual override switches. Consequently, in high-abuse applications such as schools and offices, the lens is continuously poked and prodded during attempts to activate the manual override switch. For example, the lens is often damaged due to acts of vandalism. Thus, the structural integrity of the lens is often compromised and requires replacement.

Ultrasonic sensors utilize transducers to emit and receive sonic energy. Typically, to minimize the size of the device, the transducers are mounted directly onto the circuit board. The transducers are arranged perpendicular to the circuit board and define an axis. The transducers send and receive a sensitivity pattern. The sensitivity pattern is strongest on the transducer axis. The sensitivity pattern weakens away from the transducer axis. Therefore, the resultant composite sensitivity pattern of the sender and receiver transducers is considerably greater along the transducer axis, but, considerably less to the sides. This is undesirable, since the sensor pattern should have uniform sensitivity to the sides of the transducer axis to effectively cover the entire controlled space.

To protect the ultrasonic transducers, a grille is typically placed in front of the transducers. The grille is typically designed with openings to allow suitable passage of acoustic energy through the grille. When servicing the connected lighting load, power should be disconnected from the load. Circuit interruption at the breaker is the preferable way to disconnect power; however, electricians often use a manual wall switch to disconnect power to a circuit. An automatic occupancy sensor wall switch may subsequently re-energize the load, thus, presenting a problem. Consequently regulatory bodies often require a switch in the occupancy sensor to prohibit the sensor from energizing the load. This is commonly referred to as an "air-gap" switch, indicating that it is composed of metal contacts separated by air.

The air-gap switch in an occupancy sensor is typically hidden and requires disassembly of the switch cover plate for access. After completing service on the lighting load, an electrician should close the air-gap switch, but, often this step is forgotten. Consequently, the switch cover plate is reassembled with the air gap switch left in the open position. This necessitates a return to the switch and subsequent disassembly and reassembly of the cover plate to close the switch. Thus, valuable time is wasted.

Accordingly, in order to address these disadvantages, there have been various additional attempts to provide improved occupancy sensors. Examples of such occupancy sensors are disclosed in U.S. Pat. Nos. 6,798,341 to Eckel et al.; U.S. Pat. No. 6,587,049 to Thacker; U.S. Pat. No. 6,480,103 to McCarthy et al.; U.S. Pat. No. 6,222,191 to Myron et al.; U.S. Pat. No. 6,150,943 to Lehman et al.; U.S. Pat. No. 6,082,894 to Batko et al.; U.S. Pat. No. 6,049,281 to Osterweil; U.S. Pat. No. 5,973,594 to Baldwin; U.S. Pat. No. 5,861,806 to Vories et al.; U.S. Pat. No. 5,703,368 to Tomooka et al.; U.S. Pat. No. 5,394,035 to Elwell; U.S. Pat. No. 5,392,631 to Elwell; U.S. Pat. No. 5,363,688 to Elwell; U.S. Pat. No. 5,319,283 to Elwell; U.S. Pat. No. 5,293,097 to Elwell; U.S. Pat. No. 5,281,961 to Elwell; U.S. Pat. No. 5,142,199 to Elwell; U.S.

Pat. No. 4,841,285 to Laut; U.S. Pat. No. 4,751,399 to Koehring et al.; U.S. Pat. No. 4,703,171 to Kahl; U.S. Pat. No. 4,678,985 to Moski; U.S. Pat. No. 4,418,337 to Bader; U.S. Pat. No. 4,057,794 to Grossfield; and U.S. Pat. No. 2,096,839 to Barlow. Although some of the features of those occupancy sensor assemblies ease the disadvantages described above, a continuing need exists for an improved occupancy sensor assembly which facilitates maintenance of the sensor assembly, enhances effectiveness of a ultrasonic sensor, and minimizes damage to the assembly in high abuse applications.

SUMMARY OF THE INVENTION

An object of the present invention is to solve at least the above problems and/or disadvantages and to provide at least the advantages described below.

Accordingly, an object of the present invention is to provide a fascia cover plate which enhances ultrasonic transmissions and reduces damage due to tampering or acts such as vandalism.

Another object of the present invention is to provide a lens with improved durability without compromising performance.

A further object of the present invention is to prevent a switch of the assembly from being left in the disabled state after service or maintenance operations are performed.

The foregoing objects are attained by providing an occupancy sensor comprising a housing with an interior cavity; a switch configured for placement in the open and closed positions, and the switch being mounted substantially in the interior cavity of the housing; and a fascia cover plate configured for positioning on the housing to enclose the interior cavity, the fascia having a fascia rib on an interior surface, the fascia rib being arranged to interfere with the switch in the open state to prevent positioning of the fascia cover plate on the housing when the switch is in the disabled state.

The foregoing objects are also attained by providing an occupancy sensor to detect occupancy of a controlled space, comprising at least one ultrasonic transducer; and a fascia cover plate for covering the at least one transducer, the fascia cover plate having grillwork arranged to allow transmission of ultrasonic energy between the at least one ultrasonic transducer and the controlled space; wherein the at least one ultrasonic transducer is placed in close proximity to the grillwork to enhance the effectiveness of a wave pattern of the ultrasonic energy. Moreover, the grillwork is preferably shaped to direct the energy laterally from the transducer axis.

The foregoing objects are further attained by providing an occupancy sensor comprising a passive infrared sensor having a mounting plate with a window to allow infrared energy to pass through onto the infrared sensor, the mounting plate having a raised guide; and a lens with a front wall and four side walls configured for positioning over the raised guide.

Other objects, advantages, and salient features of the invention will become apparent to those skilled in the art from the following detailed description, which, taken in conjunction with the annexed drawings, discloses preferred embodiments of the invention.

BRIEF DESCRIPTION OF THE DRAWINGS

For a more complete understanding of the invention and advantages of certain embodiments thereof, reference is now made to the following description taken in conjunction with the accompanying drawings, which form a part of this application and in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
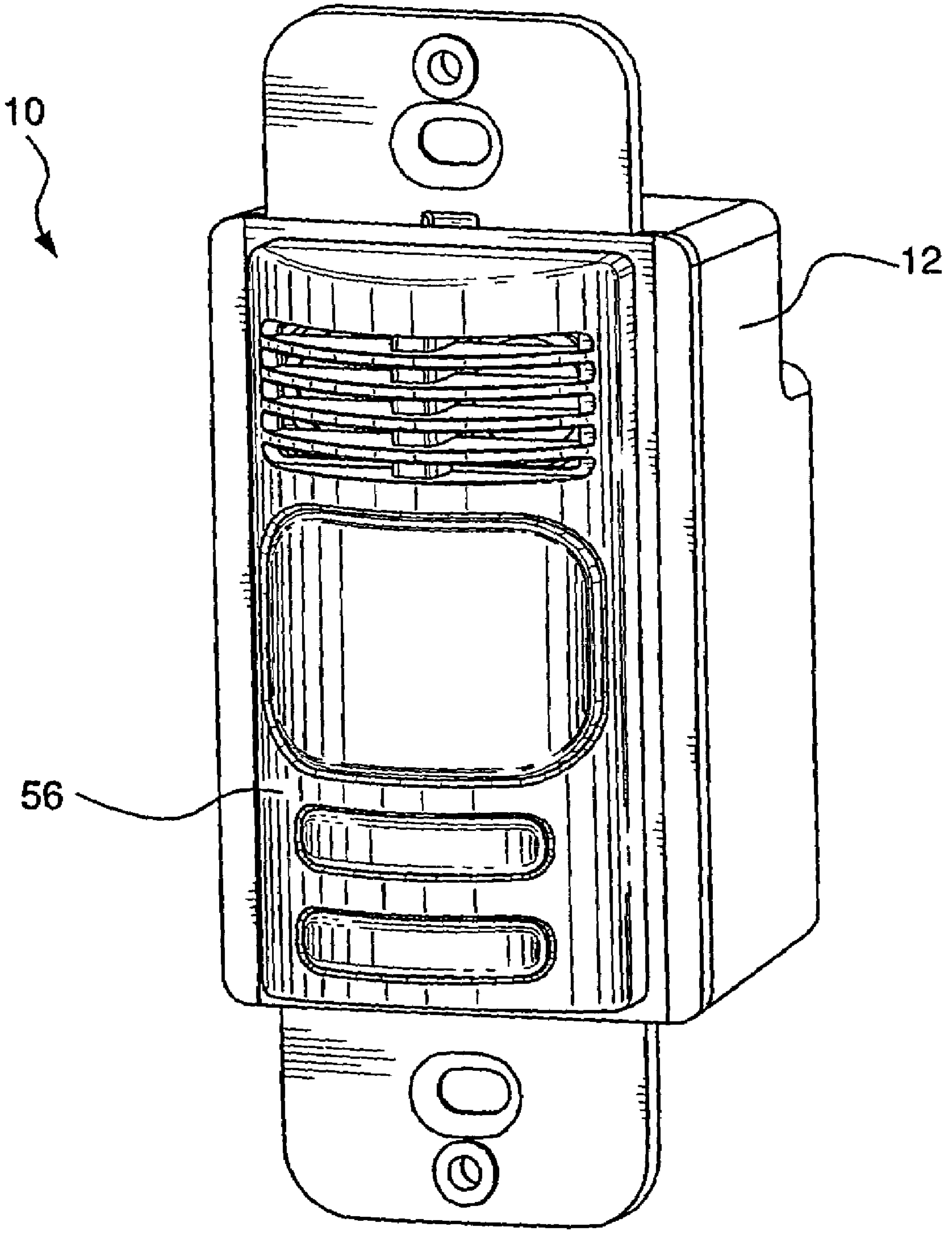
FIG. 1 is a front right side perspective view of the occupancy sensor assembly in accordance with an embodiment of the present invention.
Figure 2:
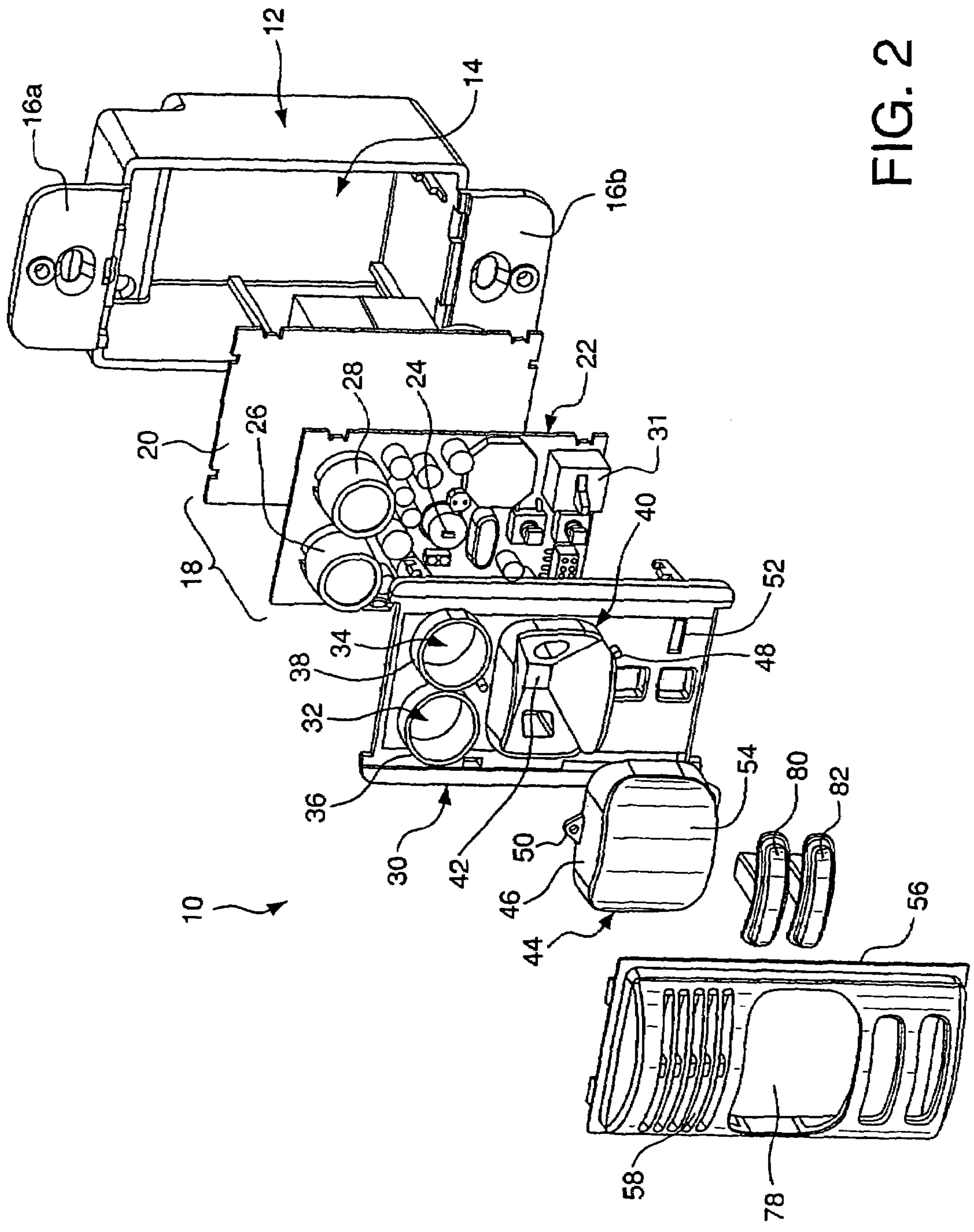
FIG. 2 is a exploded perspective view of the occupancy sensor assembly shown in FIG. 1.

FIGS. 1-2 illustrate an occupancy sensor assembly 10 in accordance with an embodiment of the present invention. The occupancy sensor assembly 10 includes a housing 12, a sensor module 18, a mounting plate 30, a lens 44, and a fascia cover plate 56.

The housing 12 comprises an interior cavity 14 defined by a top wall, a bottom wall, a back wall, and two side walls. Various support structure such as mounting ribs are located within the interior cavity 14 to support the assembly components. In the exemplary embodiment, two flanges 16*a* and 16*b* extend from the top and bottom walls along a plane parallel to the back wall. In other words, each flange laterally extends from the side walls. Each flange 16*a* and 16*b* has an aperture therein for receiving a conventional fastener such as a screw to mount the housing 12 on a support surface. Preferably, the housing 12 is mounted on a support surface such as the wall of a building. The housing 12 is preferably substantially rectangular; however, any suitable polygonal shape may be used.

As best seen in FIG. 2, the occupancy sensor assembly 10 has a sensor module 18 comprising a power board 20 and a sensor board 22. The power board 20 implements the power supply, and lighting load switching circuitry. The sensor board 22 and power board 20 are connected through a header (not shown). The sensor board 22 communicates relay control and a power supply oscillator signal to the power board 20.

The power board 20 communicates DC power and an AC voltage zero-crossing signal to the sensor board 22.

Among various other circuitry components, occupancy sensors are mounted on a top surface of the sensor board 22 as is generally known in the art. The occupancy sensors can be any parameter sensor known in the art, such as passive infrared (PIR) sensor, a ultrasonic sensor, temperature sensor, light sensor, relative humidity sensor, a sensor for the detection of carbon dioxide or other gases, an audio sensor, or any other passive or active sensor that can be used to detect movement or change from the nominal environment.

Figure 7:
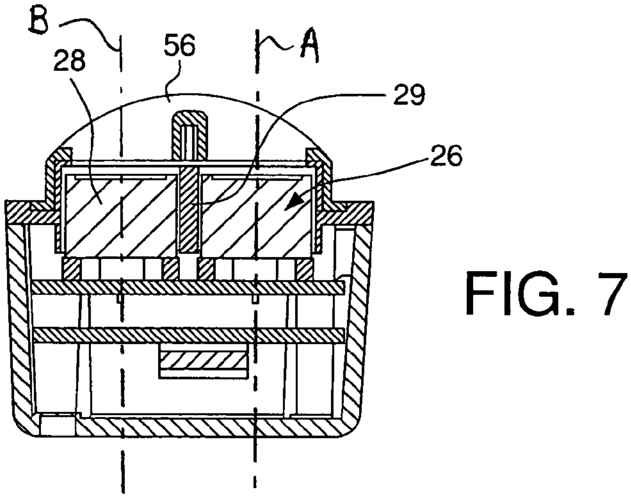
FIG. 7 is a top elevational view taken in partial cross-section along line A-A of the occupancy sensor shown in FIG. 6 showing a pair of adjacently disposed ultrasonic transducers in close proximity to the fascia grillwork.
Figure 6:
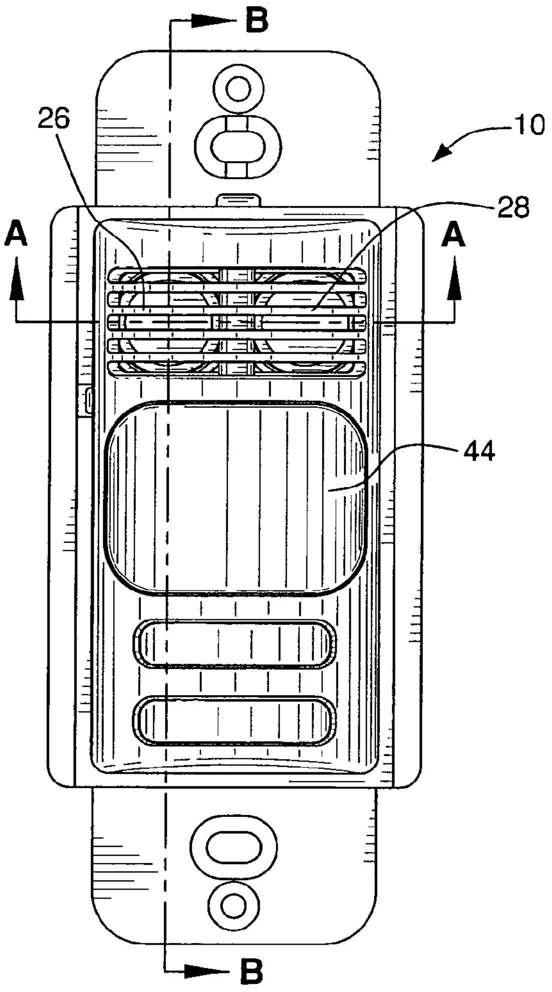
FIG. 6 is a front elevational view of the occupancy sensor shown in FIGS. 1-4.
Figure 8:
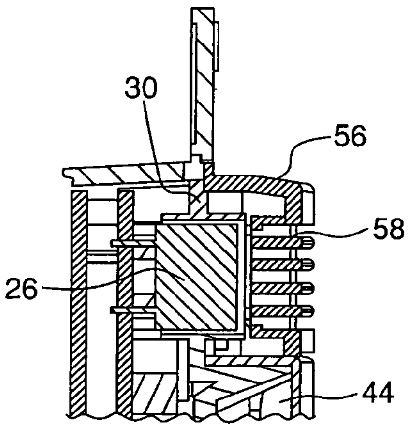
FIG. 8 is a side elevational view taken in partial cross-section along line B-B of the occupancy sensor shown in FIGS. 6-7 showing an ultrasonic transducer in close proximity to the fascia grillwork.

In the exemplary embodiment, a dual occupancy sensor is used incorporating a PIR sensor 24 and two ultrasonic sensors 26 and 28; however, it should be understood that other suitable arrangements and constructions may be used. The PIR sensor 24 is centrally located. Each of the ultrasonic sensors 26 and 28 is located above the PIR sensor 24 proximate to a top edge of the sensor board 22. As shown in FIGS. 6-8, the two ultrasonic sensors 26 and 28 are disposed adjacent to one another. A dividing rib 29 (FIG. 7) is located between the two ultrasonic sensors 26 and 28. Examples of such conventional dual technology sensors are disclosed in HUBBELL H-MOSS Occupancy Sensor Assemblies, Catalog Numbers ATD1277I and ATD 1277W.

Turning back to FIG. 2, the sensor board 22 also has a switch 31 positioned on a top surface. The switch 31 is used to prevent the relay contacts on the unit from being closed. Thus, when the switch 31 is in the disabled or open position, the occupancy sensor assembly 10 is in a disabled state. So, when adjustment or maintenance on a controlled load is required, the fascia cover plate 56 is removed. Then, the switch 31 is moved to the disabled position and the front push button switches are pressed to disable electric power to the load. Consequently, the technician is protected from injury such as electrical shock when servicing the controlled load.

The power board 20 and sensor board 22 are preferably substantially rectangular; however, any suitable shape may be used.

FIG. 2 also illustrates a mounting plate 30. The mounting plate 30 has top and bottom surfaces. Two apertures 32 and 34 extend through the top and bottom surfaces of the mounting plate 30. Extending continuously and outwardly from each aperture is a wall 36 and 38. Each wall 36 and 38 extends perpendicularly away from the top surface of the mounting plate 30. Each wall 36 and 38 is preferably substantially annular in shape and has a predetermined depth.

Depending upon the depth of the walls 36 and 38, the ultrasonic sensors 26 and 28 are positioned through the apertures 32 and 34 and at a predetermined distance from the fascia cover plate 56. By varying the placement and depth of the ultrasonic sensors 26 and 28, the ultrasonic sensors 26 and 28 ability to transmit sonic energy may be positively affected.

A raised guide 40 is centrally disposed on the mounting plate 30. The raised guide 40 has four walls with inner and outer surfaces. The inner surfaces taper inward and define an infrared energy window 42. The window 42 receives energy through which the PIR sensor 24 can view the ambient environment through the lens 44. Therefore, the raised guide 40 advantageously positions the lens 44 relative to the PIR sensor 24 so that the focal point of the lens 44 is optimized for the PIR sensor 24 at the desired wavelengths. The outer surfaces are substantially vertical walls configured to slidably engage with the lens structural walls 46. The raised guide 40 is advantageously shaped to hold the lens 44 and to prevent the lens 44 from deforming under pressure exerted from external forces such as a finger.

Protrusions 48 extend from a top surface of the mounting plate 30 for insertion into an aperture on a projection 50 of the lens 44. These protrusions 48 also assist with positioning the lens 44 relative to the PIR sensor 24.

The lower end of the mounting plate 30 includes a slot 52. Preferably, the slot 52 is substantially rectangular. The slot 52 extends through the top and bottom surfaces of the mounting plate 30 to receive the switch 31. The mounting plate 30 is preferably substantially rectangular; however, any suitable shape may be used. Except for the configuration described above, the mounting plate 30 and its connection to the sensor module 18 is generally known in the art.

Lens 44 is positioned in front of and in the field of view of the PIR sensor 24. The lens 44 focuses infrared radiation. When the PIR sensor 24 is used, the lens 44 is preferably a fresnel lens; however, the lens 44 may vary with the different types of sensors.

The lens 44 is molded in a five-wall box structure. The front wall 54 contains the optics. The front wall 54 is substantially curved to increase the rigidity and mechanical stiffness of the lens 44. The curvature also increases the area of the lens for optical gain. Four of the sides are structural walls. The structural walls are substantially vertical and extend to the bottom surface of the substantially curved front wall 54. The five-wall box structure acts to slidably engage the outer surfaces of the vertical walls of the raised guide 40 and form a cover over the infrared energy window 42. As stated above, the raised guide 40 is advantageously shaped to hold the lens 44 and to prevent the lens 44 from deforming under pressure exerted from external forces.

Extending perpendicularly from at least one of the structural walls is the projection 50 having an aperture. The protrusions 48 of the mounting plate 30 are inserted into the aperture. Thus, the lens 44 is held in place by the protrusions 48 relative to the mounting plate 30 and the PIR sensor 24.

A fascia cover plate 56 is shown in FIG. 2. The fascia cover plate 56 is removable and provides an interface between the ultrasonic transducers 26 and 28 and the ambient air in the controlled space. Openings in an upper portion of the fascia cover plate form a ported grillwork structure 58. The ported grillwork 58 facilitates air flow and the transmission of sonic energy. The ported grillwork 58 has a predetermined size, depth, and shape. Energy flows through the individual ports to and from the ultrasonic transducers 26 and 28. The exemplary shape of the ported grillwork 58 distributes the transducer energy more to the sides than the energy pattern of a transducer by itself and of a conventional fascia cover plate grillwork. This creates a desirable broadening of the ultrasonic sensing range pattern.

Figure 5:
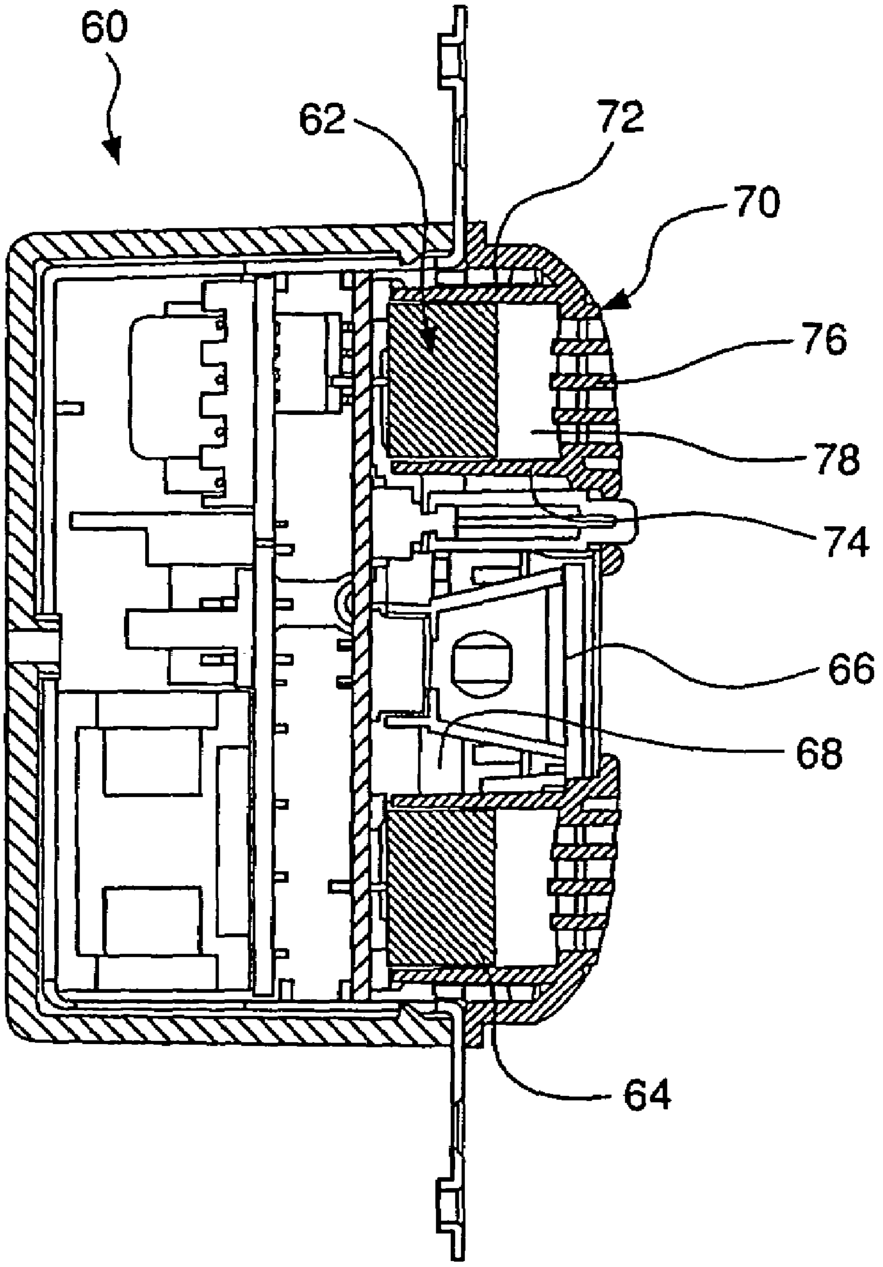
FIG. 5 (Prior Art)
FIG. 5 is a side elevational view in partial cross-section of a conventional occupancy sensor showing the ultrasonic transducers spaced away from grillwork of a fascia cover plate.

For example, a conventional occupancy sensor assembly 60 is illustrated in FIG. 5. First, in the conventional occupancy sensor assembly 60, ultrasonic transducers 62 and 64 are mounted perpendicularly to the circuit board 22. Annular rings 72 and 74 extend beyond a front surface of the ultrasonic transducers 62 and 64. Next, the depth of the individual ported grills 76 is relatively shallow, thus, leaving a relatively large gap 78 between the ultrasonic transducers 62 and 64 front surface and the grillwork 76. This arrangement allows the ultrasonic energy to continue in the direction it is emitted from the ultrasonic transducers 62 and 64, that is to say, substantially forward and not laterally.

As best seen in FIGS. 6-8, the ultrasonic transducers 26 and 28 are both arranged above the lens 44 and substantially parallel to one another. The ported grillwork 58 is relatively deep and the rear edge of the individual grills does not extend beyond a front portion of the ultrasonic transducers 26 and 28. Instead, a dividing rib 29 (FIG. 7) extends between the ultrasonic transducers 26 and 28. Moreover, the ultrasonic transducers 26 and 28 are located in close proximity to the ported grillwork 58. The first ultrasonic transducer 26 is disposed along a first longitudinal axis A and the second ultrasonic transducer 28 is disposed along a second longitudinal axis B. Axis A is substantially parallel to axis B. Thus, placing the first and second ultrasonic transducers 26 and 28 parallel to one another and in close proximity to the ported grillwork 58 increases the effectiveness of the ultrasonic wave pattern by diffusing the waves more to the sides of the occupancy sensor assembly 10.

The fascia cover plate 56 also includes a lens aperture 78 for receiving the PIR lens 24 and transmitting infrared energy therethrough. The lens aperture 78 is preferably centrally located and substantially rectangular in shape. The lens 44 preferable utilizes a clearance fit for positioning into the aperture 78; however, any suitable arrangements and constructions may be used.

The lower portion of the fascia cover plate 56 preferably includes two manual override switches 80 and 82 to override the automatically selected state of the controlled output circuits.

All manual control of circuits is reset to defaults after occupancy expires. The reason there are two override switches 80 and 82 is that some state and local energy conservation/building codes require installation of two light switches in the construction or reconstruction of offices, each to control a different portion of the overhead lighting. The reasoning behind such a requirement is that, in the interest of energy conservation, employees and janitorial personnel have the opportunity to use approximately one half of the light they would normally require in their day-to-day activities. Depending upon the amount of ambient light available, employees working in a room may select to use only one half of the available bank or banks of lights.

Figure 3:
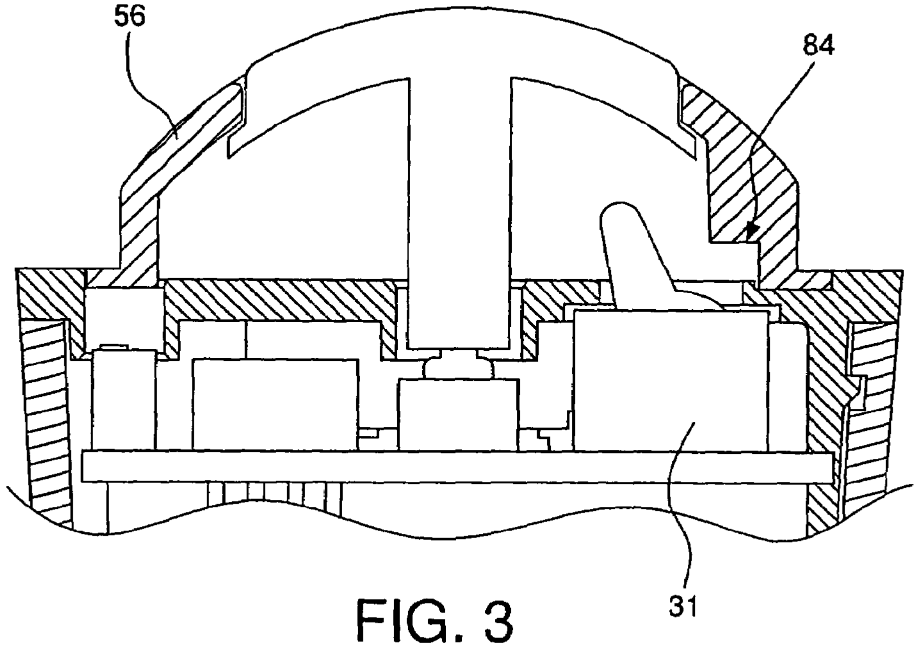
FIG. 3 is a bottom elevational view in partial cross-section of the occupancy sensor shown in FIGS. 1-2 showing the air gap switch in the closed position.
Figure 4:
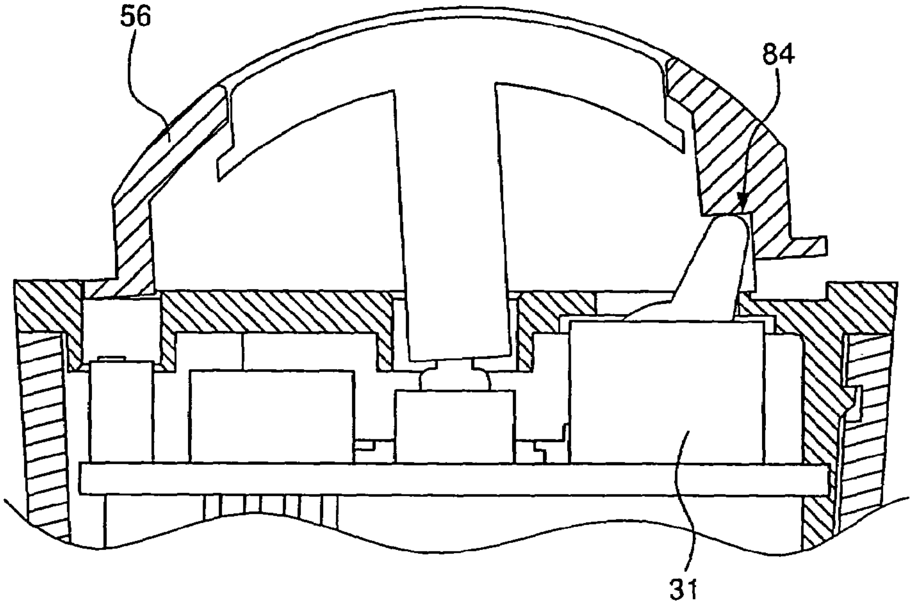
FIG. 4 is a bottom elevational view in partial cross-section of the occupancy sensor shown in FIGS. 1-3 showing the air gap switch in the open position.

As best seen in FIGS. 3-4, the fascia cover plate 56 has an interior surface. A fascia rib 84 extends outwardly from one side of the interior surface to prevent a technician from leaving the switch 32 in the open position. As mentioned above, the switch 32 is used to prevent the relays from closing contacts. Thus, when the switch 32 is moved to the disabled position, the occupancy sensor assembly 10 is in a disabled state (FIG. 4). So, when adjustment or maintenance on the load is required, the fascia cover plate 56 is removed. Then, the switch 32 is moved to the disabled position to disable electric power from the load to protect the technician from injury such as electrical shock.

When the technician completes service or maintenance, the technician should enable close the switch 32 to reconnect power (FIG. 4). However, often a technician will forget to do so. As a result, the occupancy sensor assembly 10 is reassembled without reconnecting power. In order to prevent this from happening, the fascia rib 84 interferes with the switch 32 when in the disabled position. Therefore, the technician cannot reassemble the occupancy sensor assembly 10, while the switch 32 is in the disabled position.

The fascia cover plate 56 is preferably substantially rectangular; however, any suitable shape may be used. Additionally, it is preferable that the fascia cover plate 56 is in snap-fitted engagement with the housing 12.

While the invention has been shown and described with reference to certain embodiments thereof, it will be understood by those skilled in the art that various changes in form and details may be made therein without departing from the spirit and scope of the invention as defined by the appended claims.

What is claimed is:

1. An occupancy sensor to detect occupancy of a controlled space, comprising:

first and second ultrasonic transducers oriented above a lens; and a fascia cover plate to cover said transducers, the fascia cover plate having grillwork to allow transmission of ultrasonic energy between said ultrasonic transducers and the controlled space;

wherein said first ultrasonic transducer is in a substantially parallel orientation with said second ultrasonic transducer and said transducers are arranged in close proximity to the grillwork to enhance the effectiveness of a wave pattern of the ultrasonic energy.

2. An occupancy sensor according to claim 1, wherein the grillwork has a depth.

3. An occupancy sensor according to claim 1, wherein the fascia cover plate has a fascia rib disposed on an interior surface thereof.

4. An occupancy sensor according to claim 1, wherein at least one of said transducers extends through an aperture arranged on a mounting plate.

5. An occupancy sensor according to claim 1, wherein said ultrasonic transducers are arranged adjacent to one another.

6. An occupancy sensor according to claim 1, wherein the fascia cover plate further includes a divider between said first and second ultrasonic transducers.

7. An occupancy sensor according to claim 1, wherein a rear edge of the grillwork does not extend beyond a front edge of at least one of said ultrasonic transducers.

8. An occupancy sensor according to claim 1, wherein said cover plate is adjacent to a dividing rib disposed between said first and second ultrasonic transducers.

9. An occupancy sensor to detect occupancy of a controlled space, comprising:

a first ultrasonic transducer having a first longitudinal axis and a second ultrasonic transducer having a second longitudinal axis parallel to said first longitudinal axis;

a fascia cover plate covering said transducers, said cover plate having grillwork to allow transmission of ultrasonic energy between at least one of said ultrasonic transducers and the controlled space;

wherein at least one of said ultrasonic transducers is substantially adjacent to the grillwork to enhance the effectiveness of a wave pattern of the ultrasonic energy; and a dividing rib adjacent said fascia cover plate and disposed between said ultrasonic transducers.

* * * * *